United States Patent
Kim et al.

[11] Patent Number: 6,124,707
[45] Date of Patent: Sep. 26, 2000

[54] TESTER FOR PERIPHERAL STORAGE DEVICE

[75] Inventors: Jin-euk Kim, Incheon; Dae-geun Yoo; Chang-woo Nam, both of Gumi, all of Rep. of Korea

[73] Assignee: SamSung Electronics Co., Ltd., Suwon, Rep. of Korea

[21] Appl. No.: 08/931,124

[22] Filed: Sep. 16, 1997

[30] Foreign Application Priority Data

Sep. 16, 1996 [KR] Rep. of Korea ...................... 96-40211

[51] Int. Cl.[7] .................................................. H01R 11/00
[52] U.S. Cl. ..................................... 324/158.1; 439/928.1
[58] Field of Search .............................. 324/158.1, 73.1; 361/685, 683; 439/928.1, 959, 327; 369/75.1

[56] References Cited

U.S. PATENT DOCUMENTS

| | | |
|---|---|---|
| 4,888,549 | 12/1989 | Wilson et al. ...................... 324/158.1 |
| 4,941,841 | 7/1990 | Darden et al. ...................... 439/374 |
| 4,962,355 | 10/1990 | Holderfield et al. . |
| 5,126,656 | 6/1992 | Jones . |
| 5,436,569 | 7/1995 | Melgaard et al. . |
| 5,509,193 | 4/1996 | Nixoll . |
| 5,517,125 | 5/1996 | Posedel et al. . |
| 5,518,418 | 5/1996 | Larabell ...................... 439/928.1 |
| 5,528,161 | 6/1996 | Liken et al. . |
| 5,543,727 | 8/1996 | Bushard et al. . |
| 5,557,559 | 9/1996 | Rhodes . |
| 5,596,484 | 1/1997 | Uzuki ...................... 361/685 |
| 5,614,837 | 3/1997 | Itoyama et al. . |
| 5,734,549 | 3/1998 | Oura ...................... 361/685 |
| 5,767,445 | 6/1998 | Wu ...................... 361/685 |
| 5,859,409 | 1/1999 | Kim et al. ...................... 324/760 |

*Primary Examiner*—Vinh P. Nguyen
*Attorney, Agent, or Firm*—Robert E. Bushnell, Esq.

[57] ABSTRACT

A tester for a peripheral storage device including a peripheral storage device guide received in a mobile rest which is translatable relative to a base frame. The peripheral storage device, which, when translated by the guide, connects with pogo-connectors installed in a supporting block on the base frame. The mobile rest includes a pusher for moving the mobile rest relative to the base frame, as damped by a damper.

30 Claims, 6 Drawing Sheets

TESTER FOR PERIPHERAL STORAGE DEVICE

CLAIM OF PRIORITY

This application makes reference to, incorporates the same herein, and claims all benefits accruing under 35 U.S.C. §119 from an application entitled *Tester for Peripheral Storage Device* earlier filed in the Korean Industrial Property Office on Sep. 16, 1996, and there duly assigned Ser. No. 96-40211 by that Office.

BACKGROUND OF THE INVENTION

1. Field of the Invention

The present invention relates to a tester for testing the quality of a peripheral storage device.

2. Discussion of Related Art

In general, a computer includes peripheral storage devices, such as hard disk drives, floppy disk drives anchor CD-ROM drives. Peripheral storage devices are tested, under predetermined circumstances, by a method called "aging," before they are introduced onto the market. Aging is performed inside an oven specially manufactured for that purpose, and subjects the devices to heat to accelerate the simulation of aging.

Exemplars of this practice in the art include Itoyama et al., U.S. Pat. No. 5,614,837, entitled *Probe Apparatus And Burn-In Apparatus*, which describes forks that are slidingly moved along the convey unit, and also may be moved vertically. The forks are mounted on the lower surface of a support plate fixed to a support pillar.

Posedel et al., U.S. Pat. No. 5,517,125, entitled *Reusable Die Carrier For Burn-in And Burn-In Process*, describes a base to which is rotatably mounted the lid. A hook selectively retains the lid in a locked position, while Bushard et al., U.S. Pat. No. 5,543,727, entitled *Run-In Test System For PC Circuit Board*, describes a drawer which is slidably supported within cabinet by tracks. Circuit boards are mounted on the drawer and manually attached to various cables.

Liken et al., U.S. Pat. No. 5,528,161, entitled *Through-Port Loads Carrier And Related Test Apparatus*, describes a load carrier configured to contain one or more test devices, such as printed cards used to impose a load upon the printed circuit board in a test chamber. Melgaard et al., U.S. Pat. No. 5,436,569, entitled *Electronic Component Testing Oven*, selected a carrier which may be connected to a desired component to ascertain its status as it is conveyed through an oven. The components are borne on a conveyer belt and unloaded and offloaded with the robots. Jones, U.S. Pat. No. 5,126,656, entitled to *Burn-In Tower*, describes a skeletal tower which accommodates a plurality of mounting plates for receiving devices under test. Each mounting plate includes a socket into which a semiconductor may be inserted. The mounting plate includes a plurality of locator pins that frictionally engage sockets in the tower.

I have found that, in a typical oven, inconventional testers cannot accommodate a large number of the peripheral storage devices to be tested simultaneously because the devices are placed onto the peripheral storage device from above. I also have found that installation and removal of the peripheral storage devices from the tester is problematic.

SUMMARY OF THE INVENTION

An objective of the present invention is to provide an improved tester and test process for peripheral storage devices.

Another objective is to provide a tester and test process for a peripheral storage devices that minimize damage to the peripheral storage devices caused by abrupt installation and removal of the devices from the tester.

Yet another objective is to provide a tester and test process for peripheral storage devices that can be stacked inside an oven in greater numbers.

Still another objective is to provide a tester and test process that facilitate quick insertion and removal peripheral storage devices from the tester.

These and other objectives may be attained with a tester, and a process that uses the tester constructed with a base frame having a peripheral storage device guide supported by the base. The guide has guide walls that receive and retain a plurality of peripheral storage devices during testing. A supporting block that is installed on the base frame faces a leading edge of the inserted peripheral storage device. A pogo-connector is installed in the supporting block and contacts the inserted peripheral storage device. A mobile rest is positioned between the base frame and the peripheral storage device guide to receive and to travel with the peripheral storage device as the device is inserted into and ejected from the base. A pushing mechanism, installed between the mobile rest and the base frame, advances the peripheral storage device toward the pogo-connector when the peripheral storage device is inserted. A damper is installed in the supporting block to assure smooth movement of the mobile rest.

In a preferred embodiment, the damper may be constructed with a rack push bar installed in the supporting block to move back and forth and reciprocally accommodate the insertion and ejection of the peripheral storage device. A hook is formed at the end portion of the rack push bar to retract the mobile rest when the rack push retreats. A damping gear installed in the supporting block engages the rack. A roll spring installed in the base frame is coupled with the rack push bar to elastically bias the rack push bar to advance.

The pushing mechanism may be constructed with a lever pivotally coupled to the base frame and an end portion of the lever rides in a cam slot formed in the mobile rest and the other end portion of the lever is exposed to the outside of the tester. A pair of second links is disposed with one end portion of each link being coupled with the other end portion of the second link being pivotally coupled to the base frame. A support rod is installed between the coupling portions where the first and second links are joined together, and an engaging portion is formed on the mobile rest and interlocked with the hook.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
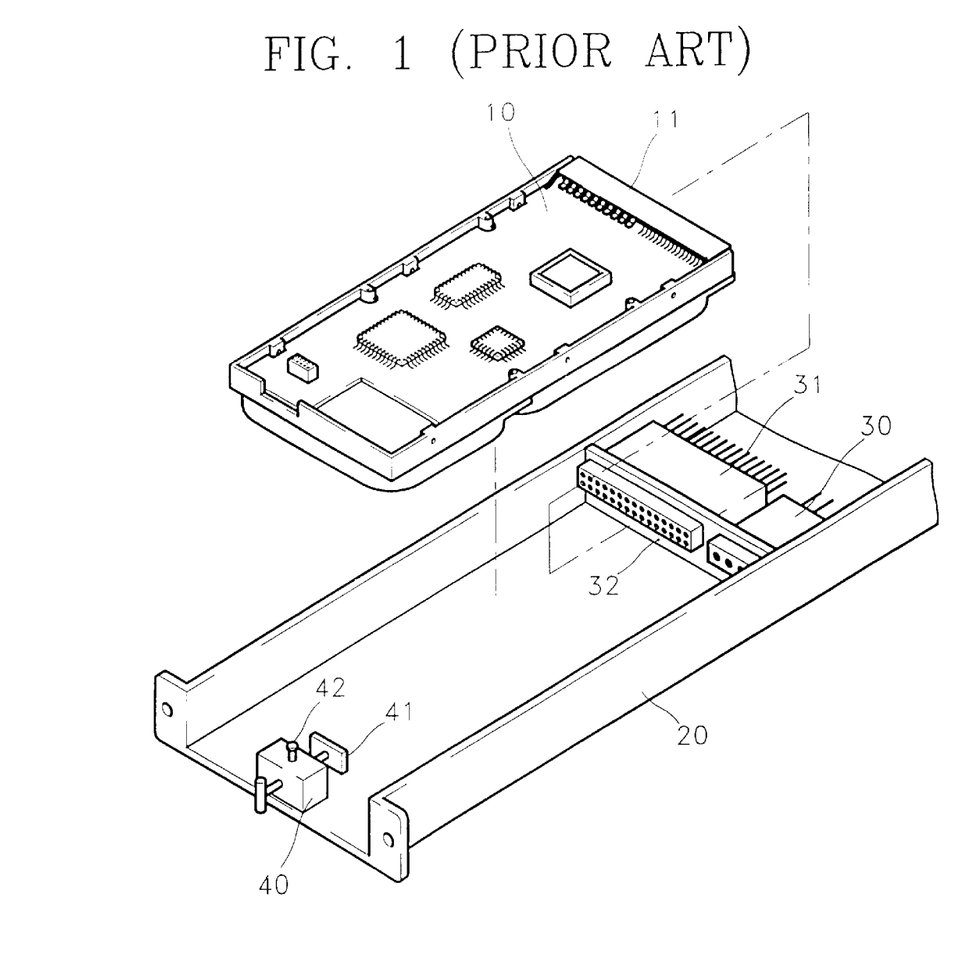
FIG. 1 is a top right front exploded perspective view of a tester for a peripheral storage device.
Figure 2:
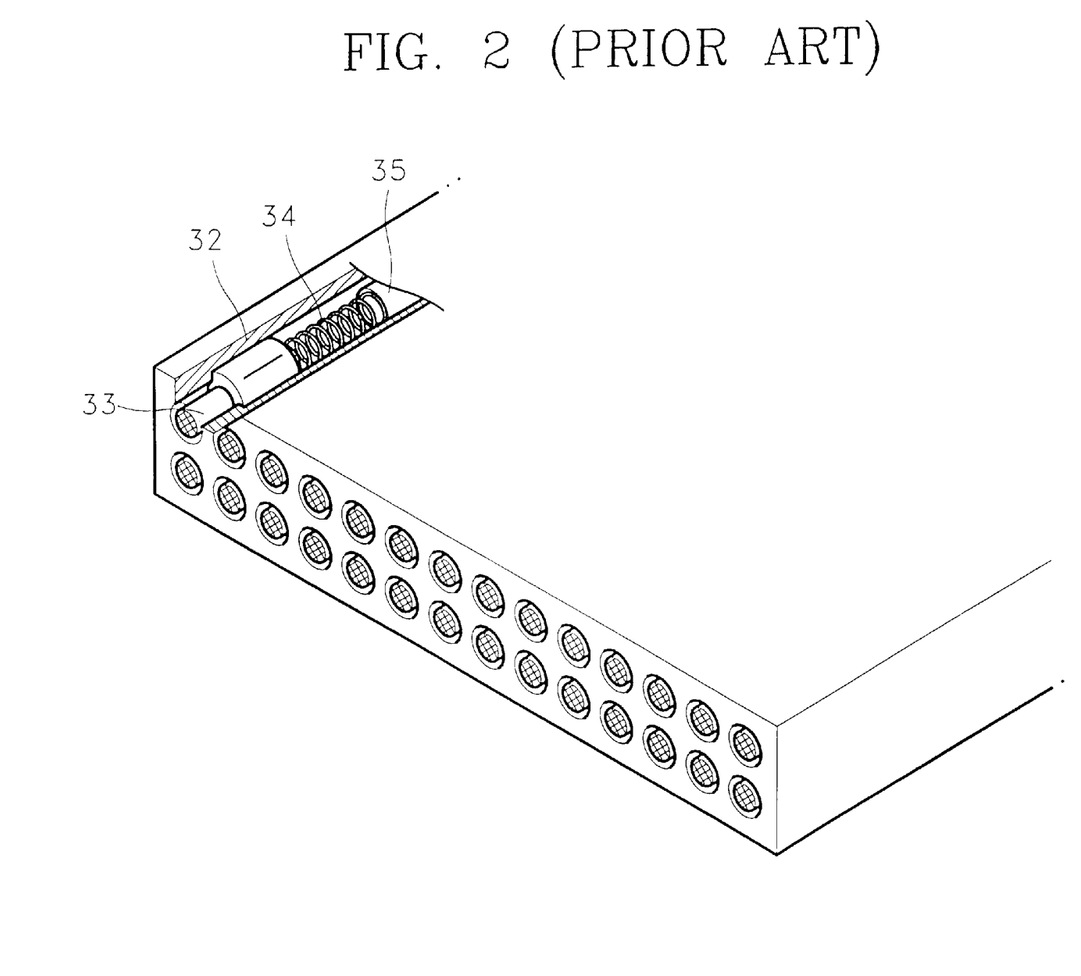
FIG. 2 is a partial, enlarged, top right front perspective view, partially in cross section, of the pogo-connectors shown in of FIG. 1.

Referring to FIGS. 1 and 2, a hard disk drive tester typically includes a base frame 20 which supports a hard disk drive 10, an array of electrical connectors, such as a pogo-connector 30, and a supporting block 40. The pogo-connector 30 includes pogo-pins 32 electronically connected to a data pin (not shown) and a power pin (not shown) of the hard disk connector 11, and a connection pin 31 which is connected to a computer (not shown). Each pogo-pin 32 includes a contact port 33, a partially compressed pogo-spring 34 and a connection port 35.

When testing a hard disk drive 10, the installer inserts the hard disk drive 10 onto the base frame 20, and makes adjustments by pushing the pusher 41 of the supporting block 40 so that the connector 11 of the hard disk drive 10 makes electrical contact with each of the plugs of pogo-connector 30. Then, a lock 42 is depressed to keep the pusher 41 from retreating and thereby breaking the electrical connection between the plugs and pogo-connector. The hard disk connector 11 and the pogo-connector 30 are electrically connected securely due to the force exerted by pogo-springs 34. Once locked into place, the test may take place.

After the test is completed, the lock 42 is released, thereby releasing the pusher 41. The hard disk drive 10 is disengaged from the pogo-connector due to the force of springs 34, potentially damaging the hard drive unit by bumping against the supporting block 40. Moreover, I have found that this design requires insertion of drive 10 into drive base 20, thereby restricting the number of drives that may be tested simultaneously in an oven.

Figure 3:
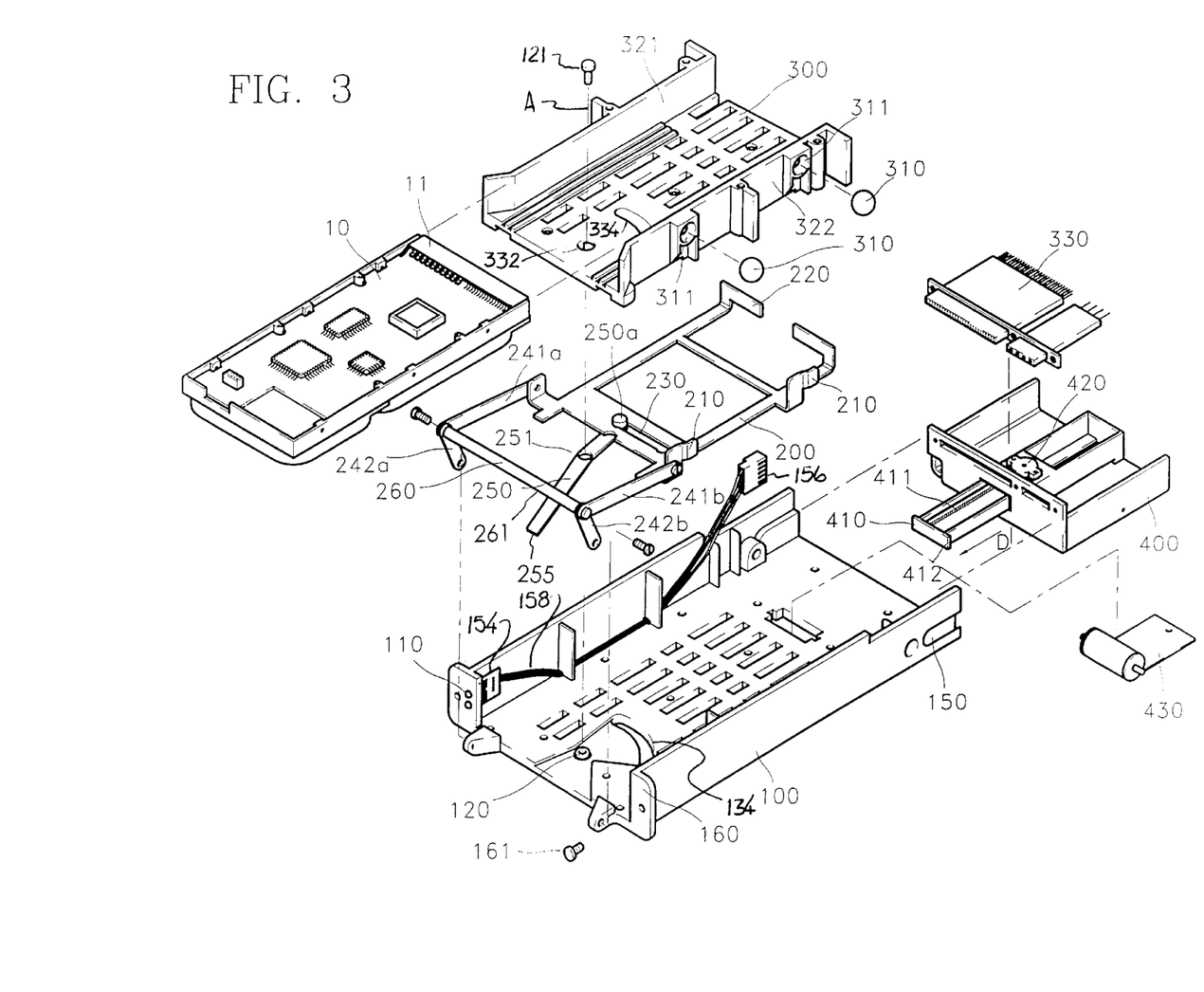
FIG. 3 is a top right front exploded perspective view of a tester for a peripheral storage device constructed to the principles of the present invention, with the peripheral storage device being shown, for illustrative purposes only, as not being part of the invention.
Figure 4:
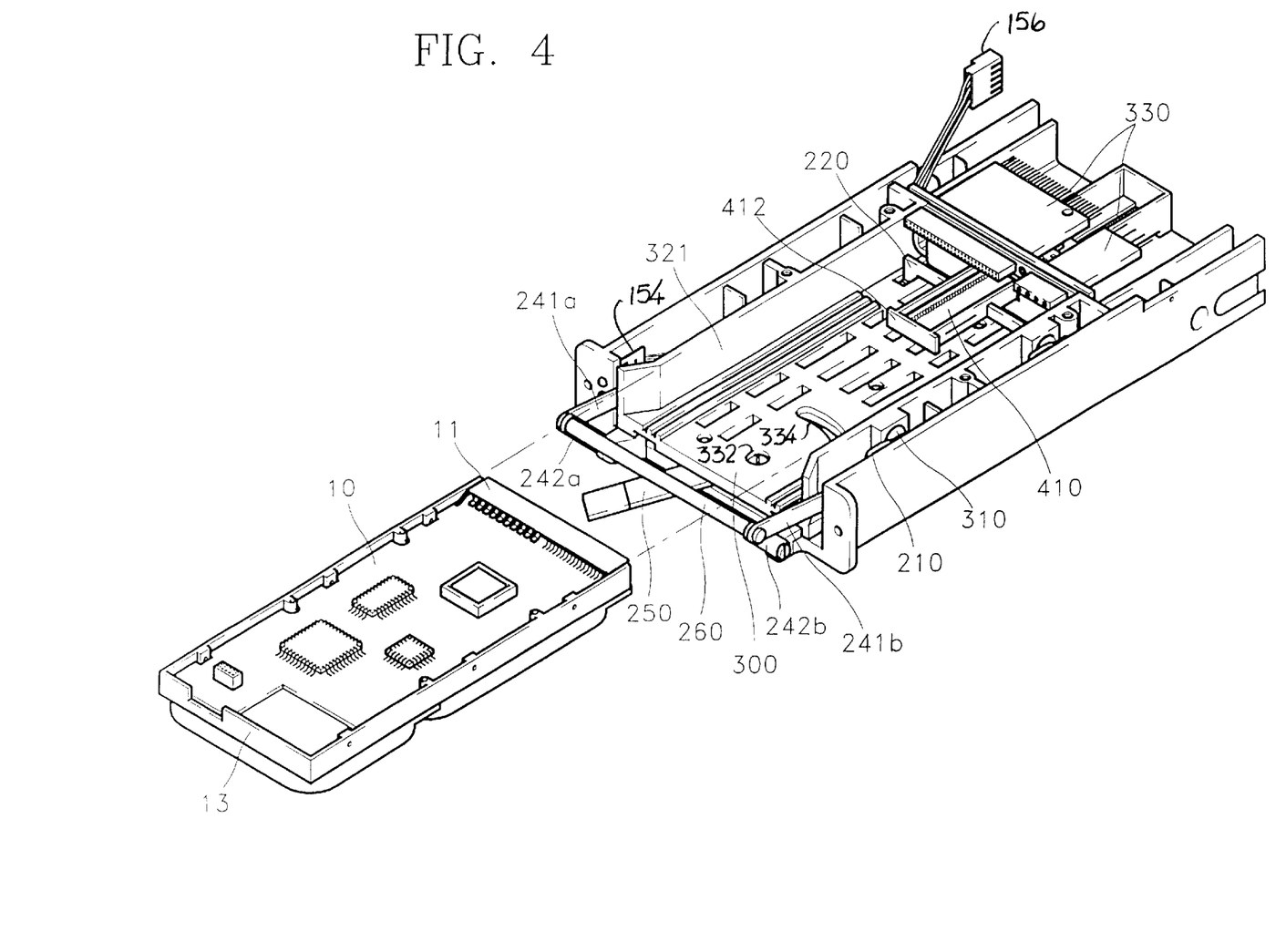
FIG. 4 is a top right front perspective view of the tester illustrated in FIG. 3, shown while receiving a peripheral storage device.

Referring to FIGS. 3 and 4, a peripheral storage device guide 300, a supporting block 400, a lever 250, a mobile rest 200 and a roll spring 430 are installed in a base frame 100 of a peripheral storage device tester constructed in accordance with the principles of the present invention. The base frame 100 and the peripheral storage device guide 300 are, preferably, constructed from anti-static plastic containing conductive carbon fiber exhibiting a resistance in the range of $10^5 \sim 10^7$ Ω. An electrical connector 154 couples the contacts of lamp 110 to plug 156 via a set of leads 158 that run along the lower inside length of frame 100.

A conventional hard disk drive 10, which is a workpiece and not a constituent element of the present invention, is inserted into the peripheral storage device guide 300, guided by a reference guide wall 321 and an auxiliary guide wall 322. The auxiliary wall has ball holes 311, receiving balls 310.

A pogo-connector 330, to which the hard disk drive 10 is connected, is fixed to the supporting block 400, installed in the base frame 100, facing a leading edge of the inserted hard disk drive 10. A damper, preventing abrupt movement of the mobile rest 200, is installed in the supporting block 400.

The damper may include a translatable rack push bar 410 having a rack 411. A hooking piece 412 engages an engaging portion 220. A damping gear 420 (having teeth not shown), fixed to the supporting block 400, engages with the rack 411 (having teeth not shown) and a roll spring 430, rotatably installed in the base frame 100. The damper discourages abrupt movement of the hard disk drive 100 which otherwise may be occasioned when the pogo-spring 34 acts against the peripheral and the roll spring 430 acts against the push bar 410. Other damping means also may be employed to accomplish substantially the same function as the aforementioned damper.

The mobile rest 200 is slidably or pivotally mounted on the base frame 100, interposed between the base frame and the peripheral storage device guide 300. A lever 250 controls the movement of the mobile rest 200 within a predetermined distance. The mobile rest 200 includes a cam slot 230 into which a protrusion 250a, formed at one end of the lever 250, is inserted. A ball pusher 210 urges the ball 310 toward the hard disk drive 10. When the mobile rest 200 is moved toward the pogo-connector 30, the ball pusher 210 pushes the ball 310 such that the hard disk drive 10 is pushed toward the reference guide wall 321. An engaging portion 220, which interlocks with the hooking piece 412 of the damping means, controls the mobile rest 200.

A pusher 261 facilitates pushing the hard disk drive 10 toward the pogo-connector 330. The pusher 261 includes a pair of first links 241a and 241b, one end of each link being pivotally coupled with the mobile rest 200. A pair of second links 242a and 242b each have an end pivotally coupled with the other ends of the first links 241a and 241b, respectively. The other end of each link 242a and 242b is pivotally coupled with the base frame 100. A support rod 260 is installed where first links 241a and 241b couple with the second links 242a and 242b.

One end 250a of the lever 250 is received in the cam slot 230 while the other end 255 extends outwardly. The lever 250 is bent, at a predetermined angle, at a location 251 on the lever in registry with a hinge hole 120 of the base frame 100. When the other end 255 of the lever 250 rotates around axis A with respect to the location 251, the mobile rest 200 slidingly connected to the end 250a may be reciprocated within the base frame 100. Threaded fastener 121 presses through holes 332, 251, and mates with threaded hole 120.

To accommodate the motion of the end 250a of the lever 250, the base frame 100 has an arcuate slot 134. Similarly, the storage device guide 300 has an arcuate slot 334.

To facilitate assembly of the present device, the storage device guide 300 has an aperture 332 through which a fastener may pass to secure the pivot point 251 to the base frame 100 at the pivot point 120.

Figure 5:
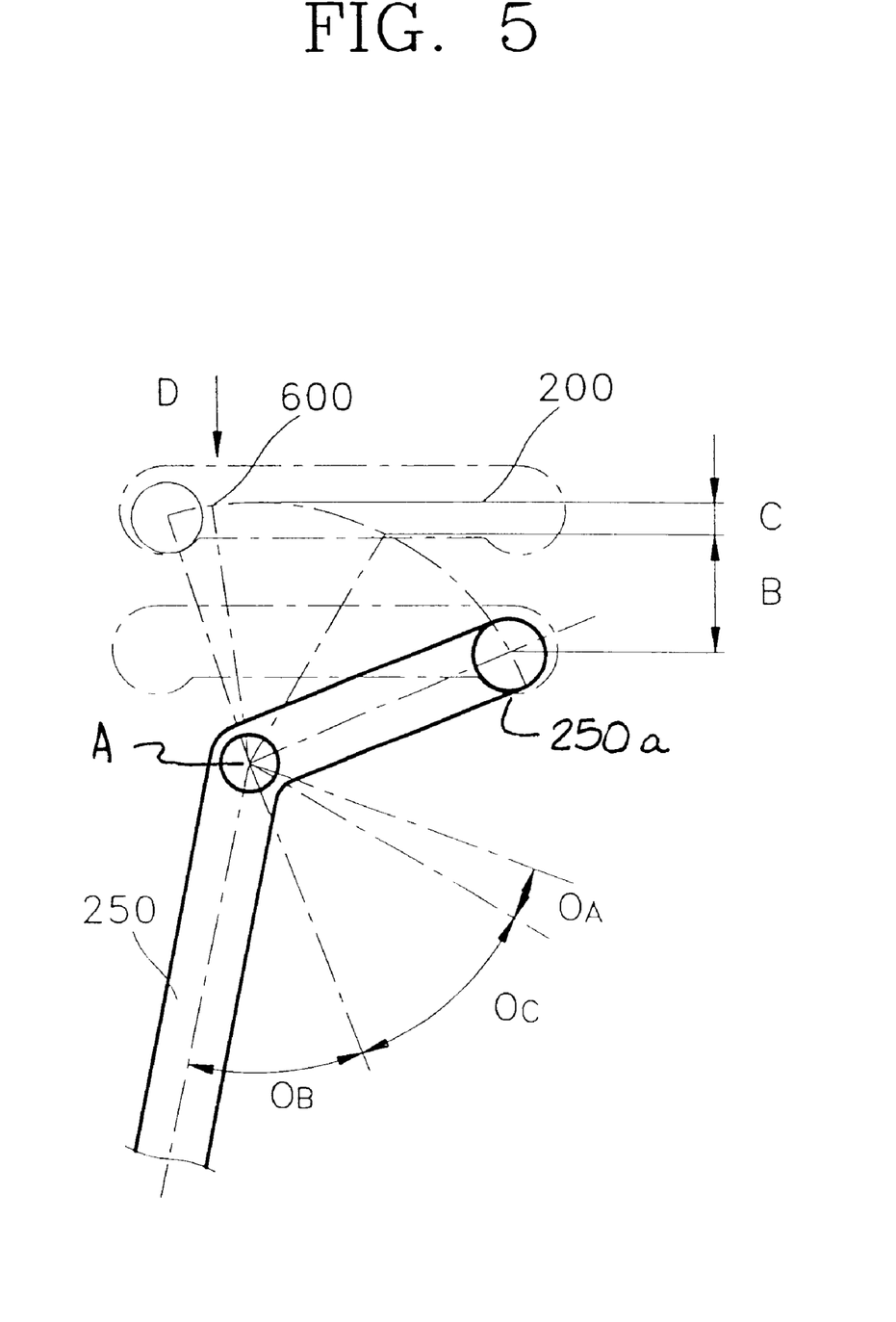
FIG. 5 is a partial plan view of the lever and cam slot shown in FIG. 3.

Referring to FIG. 5, the mobile rest 200 is restricted to translating a distance "B" when the lever 250 is rotated through an angle $\theta_B$. The mobile rest 200 translates a distance "C" when the lever 250 is rotated through an angle of $\theta_C$. The mobile rest 200 translates a relatively greater distance when the lever 250 is rotated through $\theta_B$ compared to when the lever is rotated through $\theta_C$. As is well known, when the linear travel of the mobile rest 200 is short compared to the rotating angle of the lever 250, greater force may be exerted by the lever to push the mobile rest 200. This greater force facilitates connection and disconnection of the hard disk drive 10 with respect to the pogo-connector 30.

Referring to FIGS. 3 and 4, as an installer inserts the hard disk drive 10 into the peripheral storage device guide 300 from the front side of the tester, the hard disk connector 11 pushes the rack push bar 410. The hooking piece 412 retracts with the engaging portion 220. As the engaging portion 220 retracts, the mobile rest 200 also retracts. The support rod 260 is lifted by the first links 241a and 241b and the second links 242a and 242b such that the support rod 260 contacts a trailing edge of the hard disk drive 10. As the mobile rest 200 moves back, the lever 250 rotates through angle $\theta_B$, as shown in FIG. 5. As the operator rotates the lever 250 through angle $\theta_C$, the mobile rest 200 moves a distance C and the support rod 260 pushes the hard disk drive 10 so that the hard disk drive 10 is completely connected to the pogo-connector 330.

When the mobile rest 200 moves a distance C, the ball pushers 210 push the balls 310, thus urging the hard disk drive 10 contacting the ball 310 toward the reference guide wall 321. The reference guide wall 321 serves as a reference wall for guiding the hard disk drive 10 into registry with the pogo-connector 330. The hard disk drive 10, when connected to the pogo-connector 330, is biased in a direction indicated by arrow D, as shown on FIG. 5, by a plurality of pogo-springs 34 installed in the pogo-connector 330 and the rack push bar 410, as influenced by the roll spring 430. When the lever 250 is rotated through angle $\theta_A$, beyond the top mid point 600, the hard disk drive 10 is maintained connected to the pogo-connector 30.

Referring again to FIG. 3, when the test is completed, a lamp 110 glows in the front surface of the base frame 100. The operator then rotates the lever 250 reversely through the angle $\theta_A$ to eject the hard disk drive 10. The hard disk drive 10, biased by the rack push bar 410 and pogo-springs 34, pushes and lowers the support rod 260, advancing the mobile rest 200. Since the engaging portion 220 of the mobile rest 200 is hooked by the hooking piece 412 of the rack push bar 410, and the rack 411 of the rack push bar 410 is engaged with the damping gear 420, the hard disk drive 10 is ejected smoothly.

Figure 6:
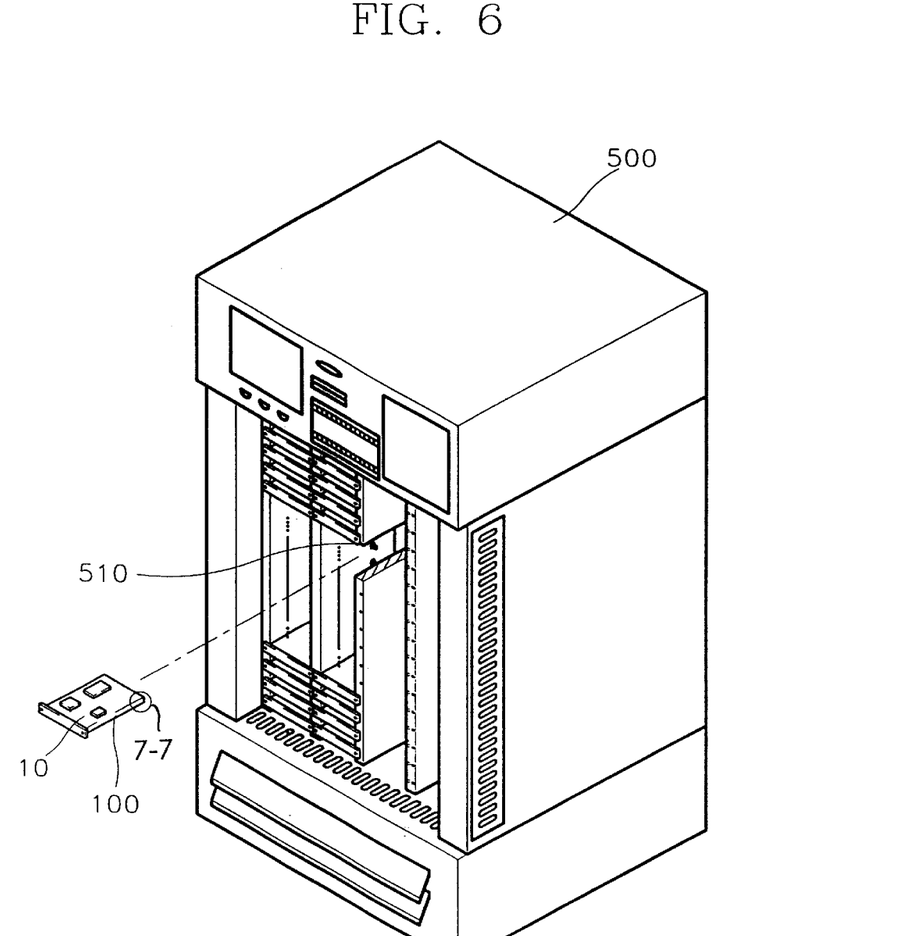
FIG. 6 is a partially exploded perspective view of an oven into which a plurality of the present testers have been installed.

As shown in FIG. 6, multiple peripheral storage device testers, according to the present invention, are installed in an oven 500. Accordingly, a plurality of hard disk drives can be tested at the same time.

Figure 7:
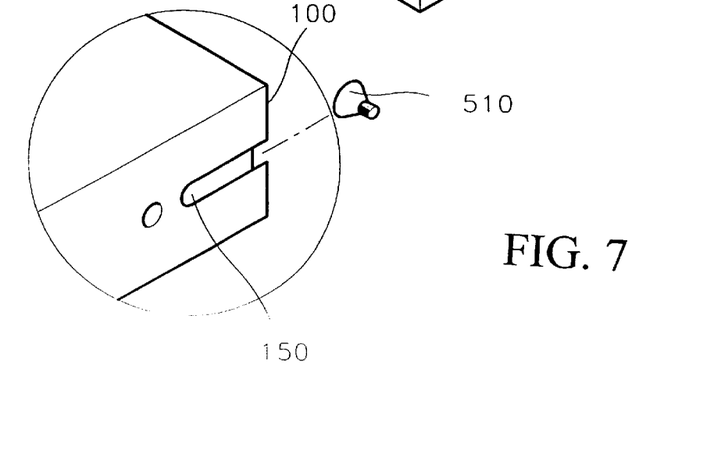
FIG. 7 is an enlarged top right perspective view of the mounting groove of the present tester, drawn across line 7—7 of FIG. 6.

Referring to FIGS. 3, 6 and 7, a fixing pole 510 of the oven 500 is inserted into a coupling groove 150 in either side of the base frame 100. Also, a rib 160 extending from the base frame 100 is fixed to the oven 500 with a screw 161.

The present invention is not limited to the embodiment described above, but encompasses all embodiments within the scope of the appended claims.

What is claimed is:

1. In an apparatus for testing a peripheral storage device, a device holder comprising:

a base including a pogo-connector connectable with the peripheral storage device;

a rest slidingly mounted on said base and including a pusher;

a lever mounted on said base for urging said rest to translate relative to said base, wherein said lever rotates through an arc and urges said rest to translate a distance corresponding to said arc;

a guide disposed on said rest and configured to receive the peripheral storage device;

a ball interposed between said rest and said guide and contacting the peripheral storage device, said pusher contacting said ball and urging translation of said guide relative to said base; and a damper influencing translation of the peripheral storage device relative to said base.

2. In the apparatus of claim 1, said rest being pivotally mounted on said base.

3. In the apparatus of claim 1, wherein said lever rotates through a plurality of arcs, each said arc corresponding to a unique distance.

4. In the apparatus of claim 1, wherein said damper comprises:

a rack push bar including a first set of teeth slidingly mounted on said base and contacting the peripheral device;

a hooking piece extending from said rack push bar and retaining said rest;

a spring interposed between said base and said rack push bar; and a gear including a second set of teeth and rotatably mounted on said base;

wherein said first set of teeth intermesh with said second set of teeth.

5. In the apparatus of claim 1, wherein said rest comprises:

a pair of first links, each comprising a first end and a second end, each said first end being coupled with said rest;

a pair of second links, each comprising a first end and a second end, each said first end of each said second link being coupled with each said second end of each said first link, defining an intersection, and each said second end of each said second link being coupled with said base; and a support rod interposed between each said intersection.

6. In the apparatus of claim 1, said device holder further comprising a lamp mounted on said base.

7. In the apparatus of claim 1, wherein said pogo-connector comprises:

a plurality of pogo-pins; and a like number of pogo-springs biasing said pogo pins relative to said base.

8. In the apparatus of claim 1, said base further comprising a coupling groove receiving a fixing pole extending from an oven and a rib configured to be mounted to an oven.

9. In the apparatus of claim 1, wherein said base is constructed from an anti-static plastic exhibiting a resistance of $10^5 \sim 10^7$ Ω, said plastic containing conductive carbon fibers.

10. An apparatus for holding a peripheral storage device for testing, comprising:

a base including a pogo-connector connectable with the peripheral storage device;

a rest movably disposed on said base; and a guide disposed on top of said rest and configured to receive the peripheral storage device.

11. The apparatus of claim 10, wherein said rest is pivotally mounted on said base.

12. The apparatus of claim 10, wherein said rest is slidingly mounted on said base.

13. The apparatus of claim 12, wherein said pogo-connector comprises:

a plurality of pogo-pins; and a like number of pogo-springs biasing said pogo pins relative to said base.

14. The apparatus of claim 10, further comprising a lever mounted on said rest and urging said rest to translate relative to said base.

15. The apparatus of claim 14, wherein said lever rotates through an arc and urges said rest to translate a distance corresponding to said arc.

16. The apparatus of claim 15, wherein said lever rotates through a plurality of arcs, each said arc corresponding to a unique distance.

17. The apparatus of claim 10, said rest urging said guide to translate therewith.

18. The apparatus of claim 10, said rest comprising a pusher urging translation of said guide relative to said base.

19. The apparatus of claim 10, further comprising a ball interposed between said rest and said guide.

20. The apparatus of claim 18, wherein said ball contacts the peripheral device.

21. The apparatus of claim 10, further comprising a damper influencing translation of the peripheral device relative to said base.

22. The apparatus of claim 21, wherein said damper comprises:
- a rack push bar including a first set of teeth slidingly mounted on said base and contacting the peripheral device; and
- a gear including a second set of teeth and rotatably mounted on said base;
- wherein said first set of teeth intermesh with said second set of teeth.

23. The apparatus of claim 22, further comprising a spring interposed between said base and said rack push bar.

24. The apparatus of claim 22, further comprising a hooking piece extending from said rack push bar and retaining said rest.

25. The apparatus of claim 10, said rest comprising:
- a pair of first links, each comprising a first end and a second end, each said first end being coupled with said rest;
- a pair of second links, each comprising a first end and a second end;
- each said first end of each said second link being coupled with each said second end of each said first link, defining an intersection, and each said second end of each said second link being coupled with said base; and
- a support rod interposed between each said intersection.

26. The apparatus of claim 10, wherein said pogo-connector comprises:
- a plurality of pogo-pins; and
- a like number of pogo-springs biasing said pogo pins relative to said base.

27. The apparatus of claim 10, wherein said base comprises a coupling groove receiving a fixing pole extending from an oven.

28. The apparatus of claim 10, wherein said base comprises a rib configured to be mounted to an oven.

29. The apparatus of claim 10, wherein said base is constructed from anti-static plastic exhibiting a resistance of $10^5 \sim 10^7$ Ω.

30. The apparatus of claim 29, wherein said plastic contains conductive carbon fibers.

* * * * *